UNITED STATES PATENT OFFICE.

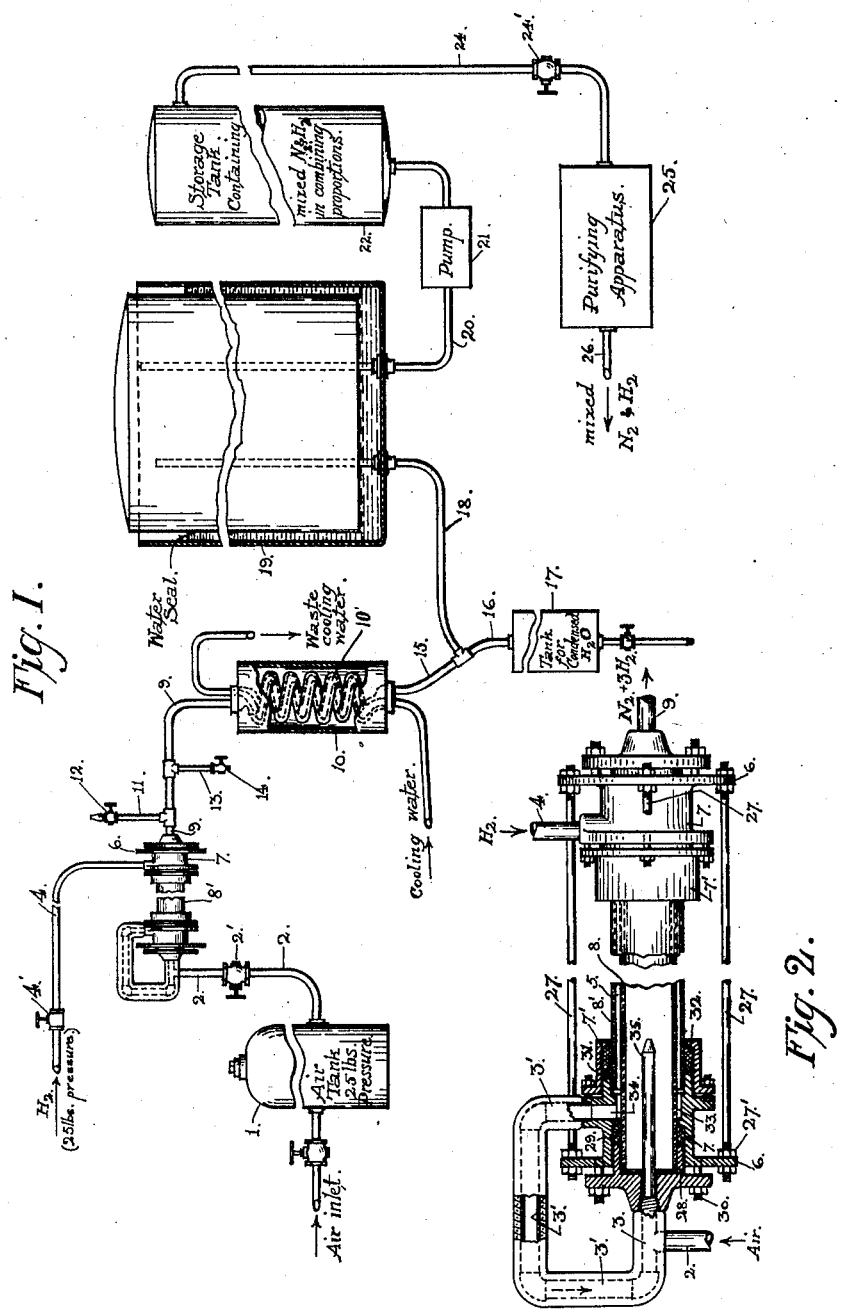

GEORGE P. GERFIN AND MAX MAURAN, OF NIAGARA FALLS, NEW YORK, ASSIGNORS TO THE NITROGEN CORPORATION, OF PROVIDENCE, RHODE ISLAND, A CORPORATION OF RHODE ISLAND.

PROCESS OF FORMING A MIXTURE OF HYDROGEN AND NITROGEN FOR AMMONIA SYNTHESIS.

1,349,756. Specification of Letters Patent. Patented Aug. 17, 1920.

Application filed November 15, 1918. Serial No. 262,716.

*To all whom it may concern:*

Be it known that we, GEORGE P. GERFIN and MAX MAURAN, citizens of the United States, residing at Niagara Falls, in the county of Niagara and State of New York, have invented certain new and useful Improvements in Processes of Forming a Mixture of Hydrogen and Nitrogen for Ammonia Synthesis, of which the following is a specification.

This invention relates to a method of and means for forming a mixture of hydrogen and nitrogen suitable for use in ammonia synthesis, and has for one of its objects the elimination of much of the costly and cumbersome apparatus heretofore employed to this end in attempted commercial operations, while at the same time reducing the number of steps or operations in such a process, substantially to a minimum.

This and other objects of our invention will be hereinafter referred to and the novel combination of steps in our improved process, and of means and elements whereby said process may be most simply and expeditiously effected, will be more particularly pointed out in the claims appended hereto.

As we are aware of various changes and modifications which may be made in the herein described process and apparatus, we desire to be limited only by the scope of said claims, broadly interpreted in the light of our disclosure.

In the drawing, which forms a part hereof, we have exemplified a preferred embodiment of the apparatus in which our said process may be effectuated.

Referring to said drawing, in which like reference characters designate like parts in the respective views:

Figure 1 is a diagrammatic representation of a system through the instrumentality of which a mixture of substantially pure nitrogen and hydrogen in combining proportions may be produced.

Fig. 2 is a detail, partly in section, showing the construction of the burner or blast lamp.

The receptacle 1, represents a tank or reservoir of air under pressure; this receptacle therefore constituting a source of air, and the pressure of the latter being conveniently about 25 or 30 pounds per square inch.

Flow of air from this reservoir through a pipe 2, leading therefrom, is controlled by a valve 2', and pipe 2 delivers to a pipe or conduit 3 in which the air is mixed with preferably preheated hydrogen. The hydrogen is supplied from a pipe 4, in which is a controlling valve 4', and passes thence through a preheating chamber 5 in the burner illustrated in Fig. 2, before it enters the mixing conduit 3, via pipe 3'.

The hydrogen is also preferably under a pressure of, for example, 25 or 30 pounds; the pressure of the resulting mixture in pipe 4, however, being materially less on account of the loss of pressure in the burner.

This burner, which preferably comprises two iron heads 6, provided with stuffing boxes 7—7' and with refractory tubes 8—8' therebetween, receives the hydrogen from pipe 4, preheats it, and subsequently receives within the tube 8, the mixture of preheated hydrogen and air from pipe 3; the combustion products, formed in said tube 8 as hereinafter described, passing from the burner through a pipe 9 to a condenser 10. The construction of the burner, which is important, will be hereinafter considered in more detail.

A preferably upwardly extending short tube or pipe 11, provided with a valve or cock 12, serves as a convenient and simple means to effect the ignition of the gases in tube 8; while a similar downwardly directed pipe 13, with its pet-cock or valve 14, affords a means to ascertain whether proper combustion conditions have been established.

The tube 8, in which combustion of the hydrogen to water is effected, is desirably of substantially pure drawn silica or like very highly refractory material which is incapable of deleteriously affecting the product; it being, of course, necessary to avoid using refractory material in the exposed inner wall of this tube, which could in any way contaminate the gaseous product, as by yielding oxygen, sulfur or the like, thereto.

The condenser preferably comprises a casing in which is a coil 10' through which cooling water is passed to condense the water present in the gases leaving the burner. Both the gases and condensed water leave the condenser via pipe 15; the water draining off through pipe 16 into an air tight tank 17, or the like, while the gases pass through pipe 18 to a gasometer 19 or other suitable receptacle.

The latter is connected by a pipe 20, preferably, with a compression pump 21 which delivers the gaseous mixture, under pressure, to a storage tank 22, whence the gases are caused to flow at the rate and in the manner desired through a pipe 24 to a suitable purifying apparatus 25 containing provisions for removing any remaining traces of water, oxygen or the like. As the details of the purifying apparatus, per se, form no part of the present invention and since the use of soda-lime and like absorbents for water vapor and other impurities, is well known, this apparatus need not herein be further described.

The flow of gas through the purifying apparatus is controlled by the valve 24' in pipe 24 and this gas, or gaseous mixture, is preferably, although not necessarily, at such time under a pressure of about 150 pounds per square inch; the pump 21 delivering gas under this pressure to the tank 22.

The gases emerging from the apparatus 25, through the pipe 26, are now ready for use.

If it be desired to effect the synthesizing operation at a higher pressure than 10 atmospheres, as in some cases is to be preferred, this increase in pressure may be attained in a known fashion; care being taken to avoid the introduction of impurities into the material from which the ammonia is to be produced.

Before discussing the process, we shall now consider the construction of the burner in more detail. Referring to Fig. 2, it will be observed that the heads 6 are connected by tie-rods 27, which are provided with nuts, 27', to also serve as spacers. The heads and these rods, hence, together constitute a frame.

The heads are provided with glands 28 which receive the ends of the combustion shell or tube 8, and co-act with the stuffing boxes 7 to effect gas tight joints by means of packings 29; bolts 30 permitting these boxes to be packed as tightly as necessary.

The respective ends of the screening shell 8', which forms the outer wall of the preheating chamber 5, are similarly received into annular glands 31 on the heads 6, and the stuffing boxes 7' similarly co-act with these preferably beveled extensions or glands, to enable the packings 32 to seal the ends of the screening shell.

The heads 6 are interiorly recessed, as at 33, to respectively permit ingress and egress of the hydrogen, from and to the ports 34, which communicate with the pipes 4 and 3', as shown.

Aside from effecting gas tight joints, a great advantage resides in thus mounting in packing the ends of the refractory tubes, since expansion and contraction of these latter with respect to the preferably rigid frame is thereby possible without risk of injury to the tubes or of the development of leaks.

The mixing tube 3 is preferably threaded into one of the glands 28, while the pipe 9 is similarly connected to the other gland 28. With the exception of the provision of a burner, proper, or nozzle 35, which may conveniently be formed as an integral extension of the mixing pipe 3, the burner is preferably the same at both ends.

The tip of the nozzle 35, where the hydrogen and air are ignited, is located at a sufficient distance from the cast iron head, to avoid unduly heating this latter.

As above intimated, the present invention is particularly concerned with the production, in an exceedingly simple manner, of a mixture of pure nitrogen and hydrogen in combining proportions and under any desired pressure, substantially ready for use in an ammonia synthesizing operation, and the process of effectuating said production in the apparatus given by way of exemplification, will now be briefly described.

Substantially pure hydrogen, preferably under pressure, is supplied via pipe 4 to the annular space between the concentric tubes 8—8', which constitutes the preheating chamber 5. As the tube 8 is highly heated by the exothermic reaction effected therewithin, the hydrogen passing through the somewhat constricted chamber 5, becomes highly preheated, in part by direct radiation from, and in part by direct contact with, the tube 8. It is then mixed with air under a like pressure from the tank 1 or its equivalent; the valves 2' and 4' being set to admit definitely related quantities of air and hydrogen to the mixing pipe 3, so that not only shall the oxygen of the admitted air be combined with hydrogen in the burner, to form water; but, further, that after such combination has been effected there shall then be present in the gases entering pipe 9, a mixture of three parts, by volume, of hydrogen to one of nitrogen.

In starting the operation, the cock 12 is opened to permit of egress of some of the mixture through pipe 11, and the emerging gases are preferably, at once ignited. The flame flashes back into the burner and effective combustion in the manner indicated ensues practically immediately; perfect combustion being attained as soon as the silicious inner tube 8 becomes heated to a bright red, which it normally speedily does.

The cock 12 is, of course, closed as soon as the gases have been ignited and the cock 14 may then be opened to ascertain if water, or rather steam, is being formed as it ought to be; after which this test cock should also be closed.

The steam present in the pipe 9 is converted into water in the condenser 10, and flows via pipes 15 and 16 into the tank 17 in which it collects, to be blown out at intervals.

Preferably, but not necessarily, the pipe 15 is slightly inclined, as shown, to better effect a separation of the water from the gases leaving pipe 15 for passage through pipe 18 to the gasometer; but substantially all remaining entrained water will, in any case, be deposited out in the gasometer.

Pump 21 delivers the gaseous mixture to the tank 22, under a pressure of, preferably, about 150 to 200 pounds per square inch, and the compressed gas is thereafter permitted to flow through suitable purifying apparatus 25, to eliminate any traces of water, oxygen or other deleterious impurities.

The mixture of gases supplied to the burner and the resulting change therein may be approximately represented by the following equation, in which for simplicity, the air is assumed to consist of one part of oxygen to four of nitrogen:

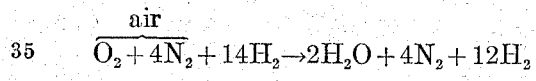

$$\overline{O_2 + 4N_2} + 14H_2 \rightarrow 2H_2O + 4N_2 + 12H_2$$

That is to say, approximately one seventh of the hydrogen supplied is consumed in converting the oxygen of the air into water; or in other words, the hydrogen is about 600% in excess of the amount thereof required to consume all of the oxygen present in a given volume of air.

The resultant gaseous mixture in such case contains nitrogen and hydrogen in combining proportions, together with the water formed and, of course, the argon and other gases, xenon, krypton, neon, etc., initially present in the air. As the argon and rare atmospheric elementary gases are inert, their presence in the gaseous product is unobjectionable; but the water formed, together with any carbon dioxid, traces of oxygen, or like impurities present, must be removed.

I consider it desirable to effect the removal of such impurities after the gaseous mixture has been stepped up to the given or desired pressure of, say, 150 or more pounds per square inch; since this permits of the use of purifying apparatus of less volume than is apt to be required where substantially uncompressed gas is treated. Further, the rate of flow of the gaseous mixture through the treating or purifying material in apparatus 25, is of course less, proportionately, when the gas is highly compressed than when it is not; while highly compressed gas may be efficaciously purified more readily than gas at but one or two atmospheres pressure, probably because more of the molecules of the gas are driven intimately into contact with the purifying material in a given time, especially when the purifying material is in solid form, like fragments of soda-lime, or the like.

I also prefer to effect purification of the gas shortly after it has been placed under a materially increased pressure; because at such time its temperature normally is higher and the reaction of the purifying material or materials upon any impurities present, is hence more vigorous.

In this connection, also, it may be well to note that it is of material advantage to supply the air and hydrogen to the burner, under pressure, as described, since this enables the obtainment of a fairly even rate of flow of the gases through the usual regulating devices. The principal reason for maintaining the hydrogen and air under approximately equal pressures, is, correspondingly, to enable the regulating valves 2' and 4' to be properly adjusted with facility.

In effecting the combustion, the excess hydrogen behaves, in effect, as an inert diluent; because there is only a relatively small quantity of oxygen present, per unit of volume. The result is that if the great quantity of hydrogen introduced into the burner is not properly preheated, there is a tendency to slow down and retard the combustion of the given limited percentage thereof with the oxygen, and this favors the formation of product which includes perceptible traces of uncombined or free oxygen. The effectuation of the combustion under the prescribed conditions, however, practically eliminates this tendency.

When said combustion is proceeding favorably, the silicious tube of the burner glows brightly red; but even in spite of the relatively high temperature thereby indicated, traces of uncombined oxygen may escape into the tube 9, if, for example, the tube 8', or an equivalent screen, be not provided and cold drafts of air or the like are allowed to impinge upon the outside of the tube 8. For this reason, aside from any question of preheating the gases, it is desirable to provide a shell 8', or the like, around the burner tube proper.

We particularly desire to emphasize the importance of maintaining proper reaction conditions in this burner or lamp; since the more nearly perfect the combustion, the less the difficulty afterward in effecting complete purification.

The air may, of course, also be separately preheated in any desired manner; but since the air and hydrogen cannot safely be highly preheated together, and since the hydrogen content of the mixture to be formed in tube 3, normally greatly exceeds that of the air in said mixture, we have found it best to highly preheat the hydrogen alone, and then to form the preheated mixture simply by the addition of air thereto.

It is because of the necessarily high temperature within the burner tube, which is continuously maintained for long periods of time, that we prefer to construct the shell 8 of some highly heat resistant material such as fused silica or quartz, rather than to make it of iron or the like. Such material can be heat insulated, or otherwise have the required temperature attained therein, without danger of melting the tube or contaminating the product, and this is a feature, the importance of which can scarcely be overestimated.

In other words, a burner tube of material for use in connection with this process, should be adapted to perform a plurality of important functions in that it in large measure should prevent heat losses; it should be gas tight and adapted to withstand the pressure to which it is subjected; it should not become oxidized nor introduce impurities into the product; and it should not fail by reason of the high temperature maintained therein. Furthermore, it should be so mounted that expansion or contraction thereof cannot cause it or its associated parts to fail; while the connections thereto should be gas tight.

The construction of a burner, and especially of a gas preheating burner which shall efficiently meet these conditions, and yet be simple and relatively inexpensive, involves complications and difficulties which the preferred type of burner successfully overcomes. In this connection, also, it may be observed that an additional advantage is derived from supplying the gaseous mixture formed in the tube 3, under pressure to the burner proper; since on account of the comparative absence of pressure in the shell 8, as compared to that in tube 3, the gas mixture emerges from the nozzle 35 with sufficient velocity to cause the projection of the flame away from the tip of the nozzle, to permit the latter to be made inexpensively of iron, for example, without danger of its being melted.

If the pressure in pipe 3 be materially increased, then, of course, the combustion chamber, may be operated under pressure, to aid in effecting perfect combustion; although, operating in the manner described we produce a gaseous mixture which is practically free from oxygen, and, hence, normally, the indicated pressures suffice.

It is by no means essential that the tubes 8 and 8' be made of the same material, because the outer shell is exposed to a much less intense heat than is the shell 8; but since the preferred material is translucent, the use of such material for both shells permits of direct observation of the condition of the flame in the burner.

By means, therefor, of the above process and by the use of relatively inexpensive and simple apparatus, such as that described, we are enabled to produce a mixture of gases from which ammonia may be readily synthesized catalytically; the gaseous mixture comprising substantially pure hydrogen and nitrogen and these gases being in combining proportions.

Finally, it will be understood that by the term "water", as used in certain of the claims, such term is to be regarded as of sufficient breadth to include water vapor or steam; the use of said term being desirable to avoid circumlocution.

Having thus described our invention, what we claim is:

1. A process of producing substantially pure, mixed hydrogen and nitrogen which comprises forming a mixture of air and hydrogen, in which, per unit of volume, the hydrogen is present in excess of the amount thereof which would completely unite with the oxygen content of such volume, in the form of water, causing said mixture to flow through a conduit the walls of which are substantially incapable of deleteriously affecting the product to be formed, igniting said mixture in said conduit and maintaining the temperature of the flame thereby formed, sufficiently high to insure substantially complete elimination of free oxygen from the mixture, cooling the reaction products, separating the water therein from the gases present, compressing said gases and purifying them preparatory to the effectuation of ammonia synthesis therefrom.

2. A process of producing pure, mixed hydrogen and nitrogen which comprises, effecting a combination of the oxygen content of a gaseous mixture of hydrogen and air flowing through a conduit, with but a portion of said hydrogen, the hydrogen present in said mixture being so greatly in excess of that required for said combination, that for the greater part it behaves as an inert diluent during the course of, and tends to retard said combination, and promoting said combination substantially to completion in spite of said retarding action, by maintaining the temperature of said conduit at bright red heat.

3. A process of producing pure, mixed hydrogen and nitrogen which comprises, effecting a combination of the oxygen content of a gaseous mixture of hydrogen and air flowing through a conduit, with but a portion of said hydrogen, the hydrogen present in said mixture being so greatly in excess of that required for said combination, that for the greater part it behaves as an inert diluent during the course of, and tends to retard said combination, and promoting said combination substantially to completion in spite of said retarding action, by maintaining the temperature of said conduit at bright red heat while holding said gaseous mixture under pressure.

4. A process of producing pure, mixed hydrogen and nitrogen which comprises, establishing a continuous flow of a mixture of hydrogen and air, in the form of a jet, into a combustion chamber the walls of which are of heat insulating material, combining the oxygen content of said mixture with a portion of the hydrogen content thereof, in said chamber, to form steam, cooling the resulting gaseous mixture to condense said steam to water after the removal of the mixture from said chamber, separating said water from the gaseous mixture of nitrogen and hydrogen remaining, compressing said mixed nitrogen and hydrogen, and purifying the same while compressed.

5. A process of producing pure, mixed hydrogen and nitrogen which comprises establishing a continuous flow of a heated mixture of hydrogen and air in the form of a jet, into a combustion chamber the walls of which are of material which is a poor conductor of heat, combining the oxygen content of said mixture with the hydrogen content thereof, in said chamber, to form steam while heating said walls to a bright red heat, passing the hydrogen which is to be admixed with air to form said mixture, through a second chamber having a wall in common with said combustion chamber, said wall separating said chambers and being heated to a bright red heat, as aforesaid, highly preheating said hydrogen by heat radiation from, and by contact with, said wall, and mixing said preheated hydrogen with air to form said mixture.

6. A process of producing pure, mixed hydrogen and nitrogen which comprises, effecting a combination of the oxygen content of a gaseous mixture of hydrogen and air flowing through a conduit, with a portion of the hydrogen of said mixture, to form steam, while simultaneously imparting a portion of the heat evolved by said combination to one of the gaseous constituents of said mixture to preheat said mixture previous to the effectuation of said combination, cooling the resulting gaseous mixture to condense the steam to water, and separating said water from the gaseous mixture of nitrogen and hydrogen remaining.

In testimony whereof we have affixed our signatures in the presence of two witnesses.

GEORGE P. GERFIN.
MAX MAURAN.

Witnesses:
JOHN G. GENTLEMAN,
F. BOYNTON BUTLER.